Figure 1:
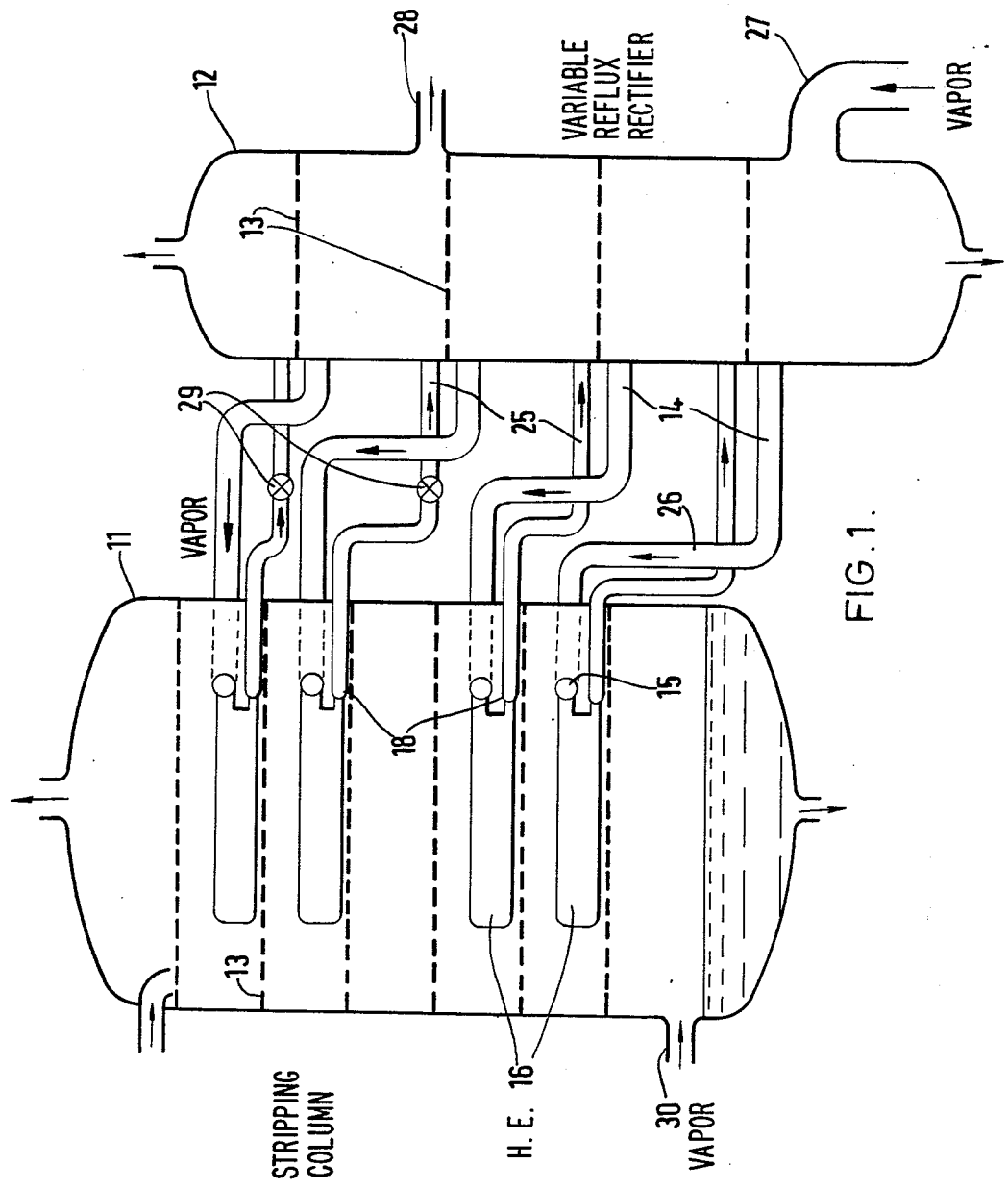

United States Patent [19]
Haselden

[11] 4,025,398
[45] May 24, 1977

[54] DISTILLATION PROCESSES AND APPARATUS

[76] Inventor: Geoffrey Gordon Haselden, 12 High Ash Drive, Leeds, Yorkshire, England

[22] Filed: Mar. 21, 1975

[21] Appl. No.: 560,812

[30] Foreign Application Priority Data

Apr. 11, 1974 United Kingdom ............ 16391/74

[52] U.S. Cl. ................... 203/25; 202/154; 202/155; 202/158; 202/172; 261/148; 203/100; 203/DIG. 19; 203/98

[51] Int. Cl.² ............ B01D 3/00; B01D 3/14; F02M 11/00

[58] Field of Search ............ 159/18; 202/174, 176, 202/158, 153, 154, 155, 159, 161, 162, 171, 172, 173; 203/73–75, 77, 78, 87, 100, 98; 165/170, 143, 145, 144; 261/148–150

[56] References Cited

UNITED STATES PATENTS

| | | | |
|---|---|---|---|
| 723,011 | 3/1903 | Naef | 202/159 |
| 1,485,475 | 3/1924 | Bacon | 159/2 MS |
| 1,774,421 | 1/1930 | Stroud, Jr. et al. | 202/161 |
| 2,621,196 | 12/1952 | Thurman | 159/18 |
| 3,109,870 | 11/1963 | Kuhn et al. | 159/18 |
| 3,151,042 | 9/1964 | Koshoot | 159/18 |
| 3,165,452 | 1/1965 | Williams | 159/18 |
| 3,303,106 | 2/1967 | Standiford, Jr. | 159/18 |
| 3,310,487 | 3/1967 | Johnson et al. | 202/176 |
| 3,320,158 | 5/1967 | Potts | 159/18 |
| 3,502,141 | 3/1970 | Allen | 159/28 R |
| 3,527,676 | 9/1970 | Hingst et al. | 159/DIG. 8 |
| 3,583,895 | 6/1971 | Othmer | 158/18 |
| 3,587,488 | 6/1971 | Mutke | 159/18 |
| 3,627,646 | 12/1971 | Osdor | 159/18 |
| 3,788,954 | 1/1974 | Cantrell | 203/74 |

FOREIGN PATENTS OR APPLICATIONS

| | | |
|---|---|---|
| 759,176 | 10/1956 | United Kingdom |
| 783,186 | 9/1957 | United Kingdom |

*Primary Examiner*—Jack Sofer
*Attorney, Agent, or Firm*—Rose & Edell

[57] ABSTRACT

In a fractional distillation process and apparatus two columns are intercoupled to provide variable reboil in one and variable reflux in the other so as to approach closely to thermodynamically ideal fractionation. The variable reboil column has a series of heat transfer assemblies at different levels up its height and these are fed with vapor withdrawn from respective different levels of the variable reflux column. Partial condensation of each withdrawn stream takes place in the respective heat transfer assembly, after which the partially condensed stream is returned to the variable reflux column at a level close to the level at which the corresponding vapor was withdrawn. The variable reflux column will ordinarily be at a higher pressure, and mounted at a lower level than the variable reboil column.

18 Claims, 10 Drawing Figures

DISTILLATION PROCESSES AND APPARATUS

This invention relates to distillation processes and apparatus.

It is known that the achievement of separation by distillation using the minimum amount of energy for producing condensation and reboil requires systems in which the amounts of reflux in the rectifying section of a column, and of reboil in the stripping section of a column, vary continuously up the column so as to attain a close approach to the minima at all levels in both sections. The economic advantages of using this, non-adiabatic, form of distillation are greatest at low temperature when it is usual for reboil and condensation to be provided by heat-pump cycles employing compression work.

In several such separation processes it is convenient to achieve the distributed source of cooling required for the rectifying section, and the distributed source of heating required for the stripping section, by arranging for direct heat exchange between the two column sections, these normally being at different pressures. An example arises in the distillation of liquid air to produce medium purity oxygen as described in British specification No: 759,176. In this process the particular form of construction described for the combined fractionation heat transfer duty comprised a sandwich construction of alternate corrugated and flat plates bonded to form a heat exchange assembly with the partially condensing and partially evaporating streams occupying alternate passages (British specification No: 783,186). The disadvantages of this particular form of construction are that it is expensive to construct, that uniform distribution of streams between a large number of parallel passages is difficult to achieve, and it is unsuitable for use at stream pressures much above 5 bar. Also the complexity and tooling requirements of this form of construction make it virtually impossible to provide for different relative rates of heat transfer and fractionation at different levels in the two intercommunicating columns, by changes in the geometry of the packing at different levels within a single construction, in order to achieve the best thermodynamic match, or to take any steps to correct a mis-match discovered during initial testing. It is an object of the present invention to overcome these disadvantages.

According to the invention, two distilling systems are arranged to interchange heat with each other, as defined above, in order to achieve a close approach to thermodynamically ideal fractionation. The arrangement is relatively cheap, is suitable for large columns sizes and can be used, if required, at high operating pressures (up to 100 bar).

Figure 2:
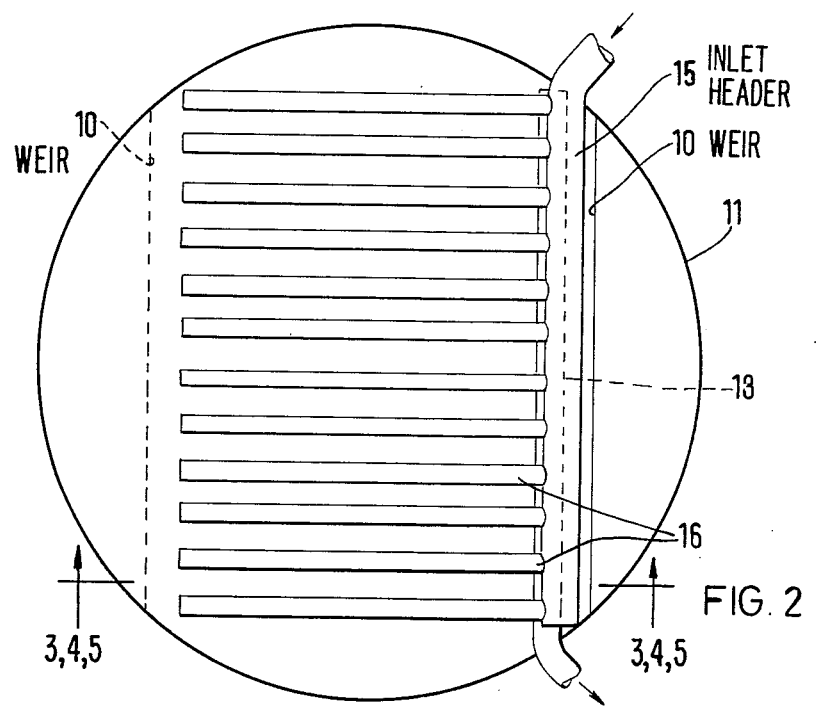
Figure 3:
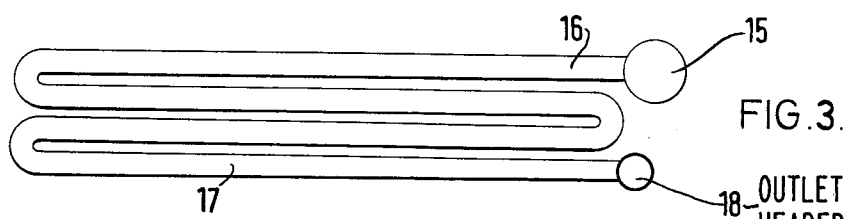
Figure 4:
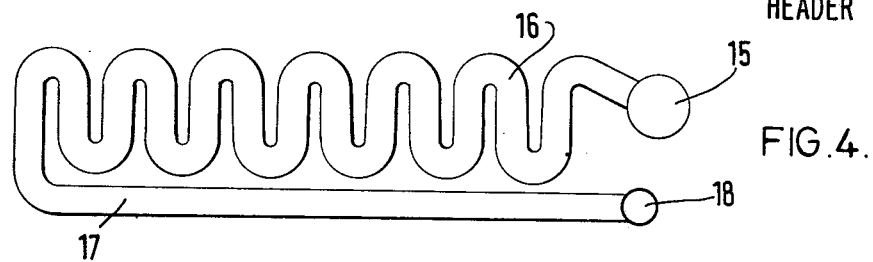
Figure 5:
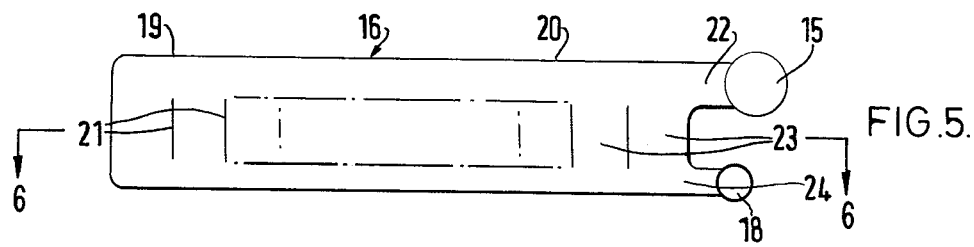
Figure 6:
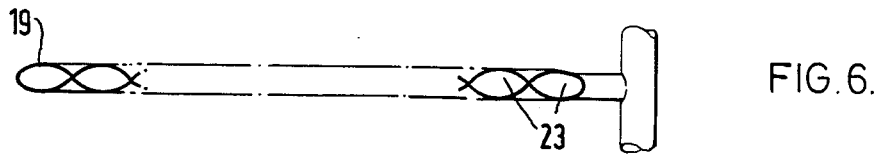
Figure 7:
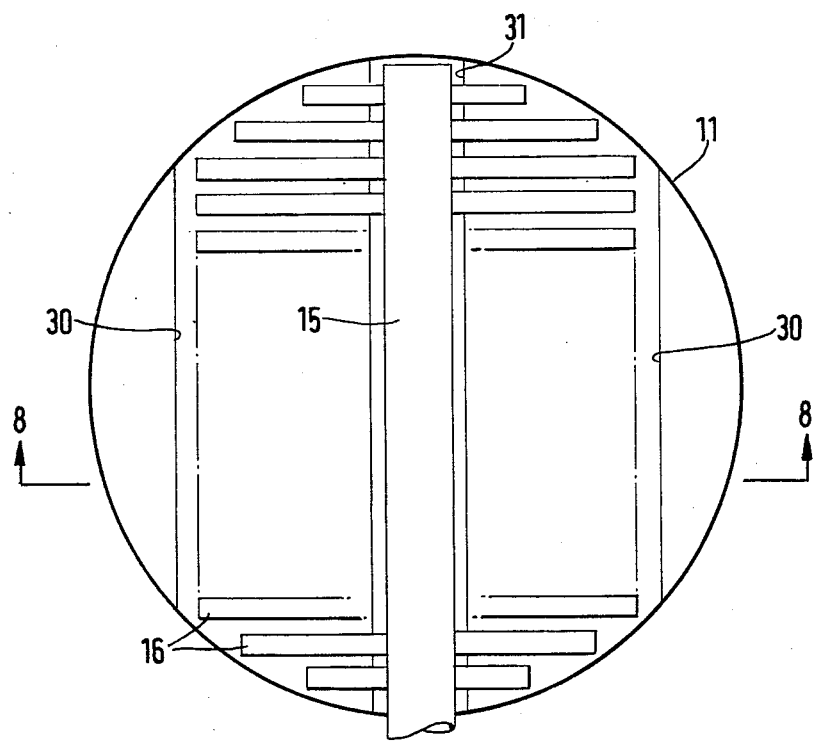
Figure 8:
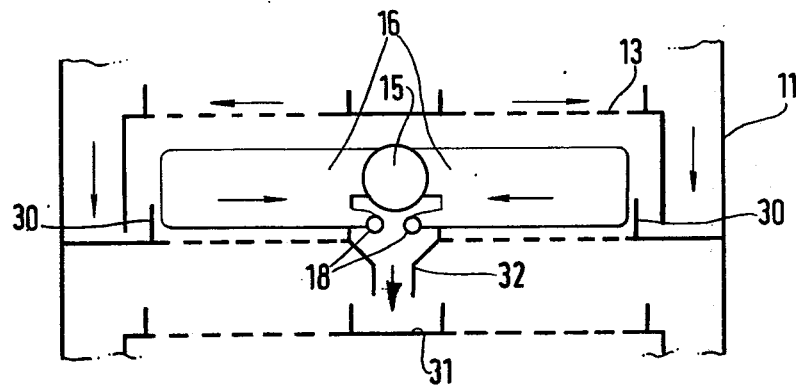
Figure 9:
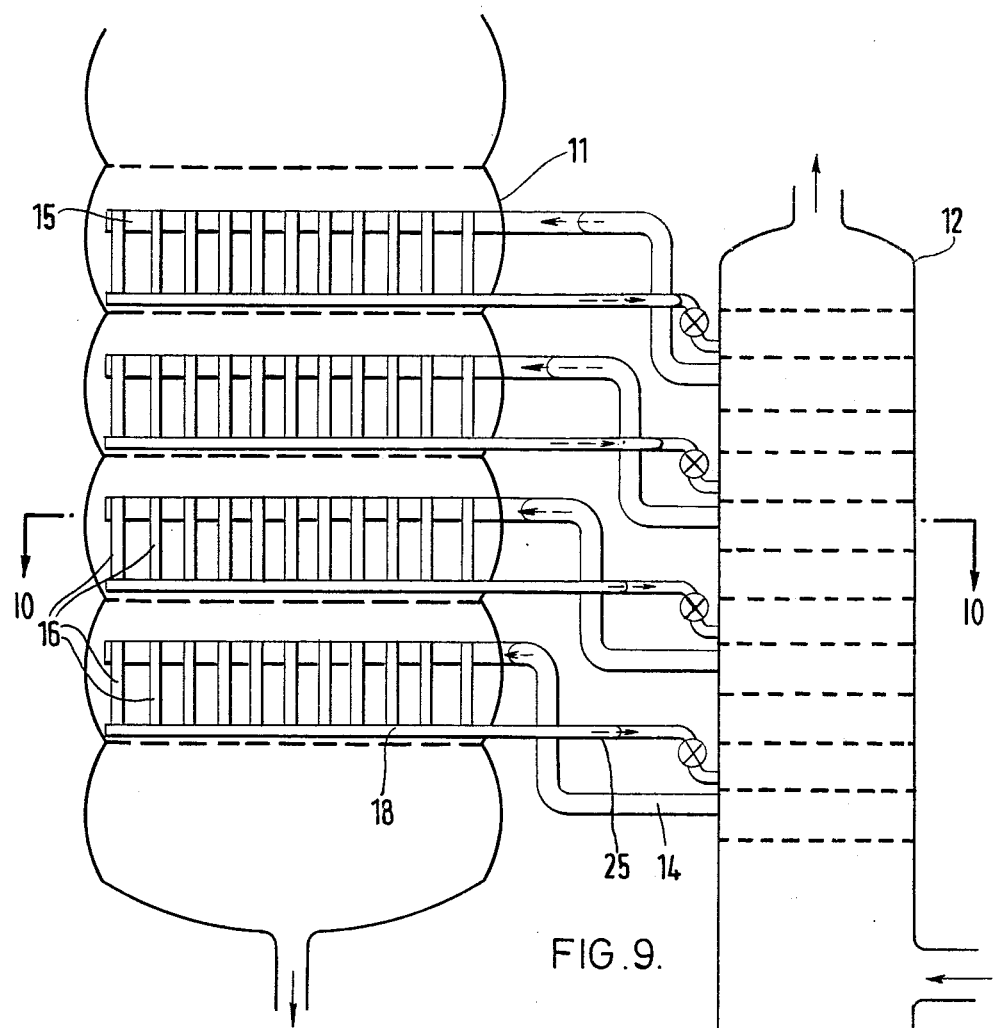
Figure 10:
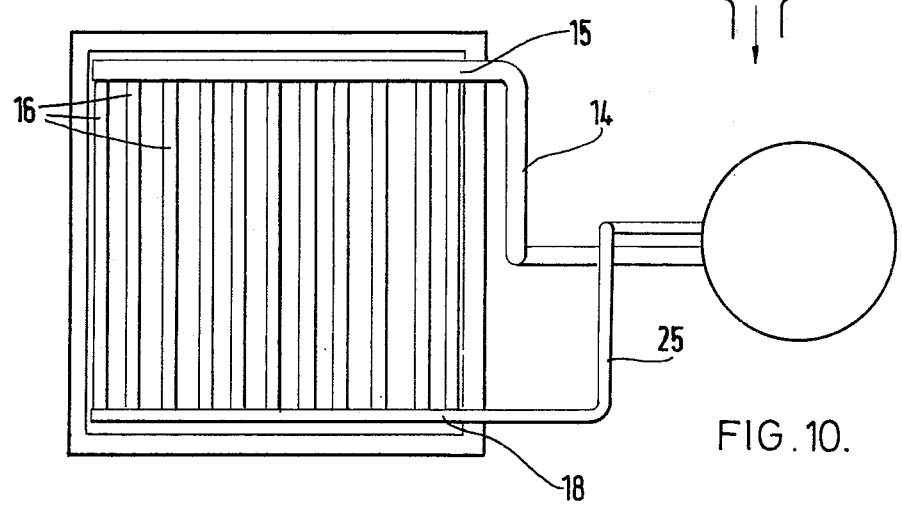

Arrangements according to the invention will now be described by way of example, with reference to the accompanying diagrammatic drawings, in which:

FIG. 1 is a diagrammatic elevation of a first embodiment,

FIG. 2 is a horizontal cross-section of one column of FIG. 1 in which fractionation under partial evaporating conditions occurs, FIGS. 3, 4 and 5 show in vertical sections three different forms of heat transfer element for this column, FIG. 6 is a horizontal section of the heat transfer element of FIG. 5, FIG. 7 is a view similar to FIG. 2 but showing the column arranged for split flow, FIG. 8 is a partial vertical section of the column arrangement of FIG. 7, FIG. 9 is a diagrammatic elevation of a second embodiment, and FIG. 10 is a sectional plan view on the line 10—10 of FIG. 9.

In FIG. 1, the plant comprises two columns 11, 12 normally mounted side-by-side, with fractionation under partial evaporating conditions (variable reboil) occurring in the first column 11 and fractionation under partially condensing conditions (variable reflux) in the second column 12. The second column 12 will usually be operating at a higher pressure than the first, in which case different compositions of the same mixture may be present in both columns. Both columns will normally contain distillation plates 13, which may be perforated or provided with bubble caps or similar contacting devices, together with weirs 10 (FIG. 2) and downcomers according to normal practice. At a number of locations up the second column 12, normally in the spaces between adjacent plates 13, vapour is withdrawn from the side of the column through one or more pipes 14. At an equal number of locations up the length of the first column 11 these pipes connect in regular sequence with inlet header pipes 15 leading into this column in spaces between plates so that the pipe, or pipes, from the lowest exit on column 12 connect with the lowest inlet header, or headers, on column 11, and so on. The spacings on the two columns will not necessarily be identical.

The inlet headers 15 connect with a series of heat transfer elements 16 positioned side by side (as best seen in FIG. 2) immediately above the surface of distillation plates 13 in column 11. These elements 16 will generally comprise a series of tubular serpentines located parallel to each other, along the length of a section of the plate 13 from near the inlet weir to near the outlet weir and having a height that is several times its width. The limbs of the serpentines may be generally horizontal, as in FIG. 3, or generally vertical, as in FIG. 4, and the return tube 17 may be brought back to an outlet header 18 near the inlet header 15.

Other forms of construction of the elements 16 may be employed. Thus, each may be essentially a plate structure with internal passages through which vapour may flow and partially condense in heat exchange with the froth above the tray. For example, as shown in FIGS. 5 and 6, the elements may each comprise a folded metal sheet 19 which is bonded around its free edges 20 and along a pattern of regular vertical lines 21 over the central area of its height, subsequently, being inflated by hydraulic pressure (following existing practice in refrigerator evaporator construction) to provide an upper conduit 22 communicating through a row of short vertical conduits 23 with a lower conduit 24. The upper conduits 22 of the plates 19 communicate with the inlet header 15 and the lower conduits 24 with the outlet header 18. Other designs of heat transfer element are also possible.

For each set of heat transfer elements 16 there is one or more of the outlet headers 18 into which the downstream ends of the serpentines, or the outlet conduits of the plates 19, communicate. The total cross-sectional area of the outlet header, or headers, 18 will be about one half of that of the inlet headers 15, and they will be mounted generally below the level of the inlet headers. The outlet headers are connected in sequence back to column 12 by pipes 25, which may have control valves 29 is desired, each pipe 25 entering the column 12 at a level above that of the corresponding outlet connection 14, the flow usually returning to the space above the plate 13 below which it left.

By means of this construction part of the vapor flowing up column 12 is drawn off, partially condenses within the heat transfer elements 16 in column 11, and rejoins column 12, flowing on to the plate above. The pressure drop across the respective distillation plates 13 in column 12, and the pressure drop across the connecting pipes 14, 25 headers 15, 18 and heat transfer elements 16 are so adjusted that a fraction normally between ½ and 1/20 of the vapor ascending the column is divided through the condensation passages in column 11, and about half (say between 1/5 and 4/5) of the diverted vapor condenses whilst flowing co-currently with the residual uncondensed vapor which also returns to column 12.

In order to facilitate the return of condensate from the heat transfer elements 16 in column 11 back to column 12, column 11 will generally be mounted somewhat higher, as shown. Thus the vapor pipes 14 connecting the outlet connections from column 12 to the inlet headers 15 in column 11 will each generally contain an up-flow vertical leg 26 so that the flow from the return headers 18 can either be horizontal or slightly downhill. The return connections to column 12 may be designed to mix the returning condensate with the column liquid on or arriving at the respective plate 13 and the returning vapor with the column vapor rising between the plates.

Considering column 12, this column will operate as a rectifying column with varying reflux since the vapor entering the bottom of the column at 27 is partially condensed as it rises from plate to plate, through part of it being withdrawn and partially condensed at a number of levels as described. The number of off-takes of vapor for partial condensation may be such that virtually complete condensation occurs by the time the residual vapor reaches the top of the column. In this case it may be necessary to decrease the flow (or perforated) area of the plates 13 in the upper part of the column so that proper contacting of vapor and liquid occurs on all the plates and it will be necessary to withdrawn and condense a larger fraction of the vapor withdrawn from the uppermost part of column 12. Provision can be made for drawing off one or more liquid condensate streams from intermediate levels in column 12, as at 28.

It is undesirable to totally condense the vapor mixture drawn off at any level from this column, except when the ascending vapor is nearly pure, because condensation will occur through a temperature range and this range should be kept as small as possible. The presence of inert constituents in the rising vapor is also catered for with the arrangement described. Vapor off-takes can be located between every pair of consecutive plates in column 12, or at regular but less frequent intervals, or irregularly, depending on the process requirements.

Considering column 11, this column will act as a stripping column with varying reboil since the descending liquid is progressively evaporated by the heat transfer elements 16. The presence of the heat transfer elements 16 on some or all of the plates or trays 13 will not necessarily impair either the throughput or the fractionation performance of this column for the following reasons.

Firstly, because the heat transfer elements do not extend over the full vertical distance between the plates, but normally occupy between 1/3 and 2/3 of this distance, the final disengagement of vapor from liquid (which determines the allowable superficial vapor velocity and hence the column diameter) is not impaired by their presence. Secondly, it has been found that baffles extending across distillation plates, generally aligned with the direction of liquid flow over the plates, improve the fractionation performance by stabilizing the foam hydraulics, in that they provide drainage paths whereby the liquid carried up in the foam can return to the plate or tray floor, and by reducing back mixing of the flowing liquid. The heat transfer elements 16 are, in effect, baffles of this character within column 11. Although column 11 is essentially a stripping column it may have an additional vapor feed at or near its bottom end, as at 30 if desired.

Valves, or other adjustable flow constrictions, may be placed in some or all of the pipelines 14 conveying liquid and vapor from column 12 to column 11 so that the balance of heat transfer along the length of the columns may be adjusted. Thus, for instance, column 11 may be designed to have more heat transfer elements 16 on its upper plates than are theoretically necessary, and optimum operating conditions may be achieved by partially or totally closing off the flow to some of these from column 12. The balance may also require to be changed if the plant is operating under partial load conditions.

FIG. 7 and 8 show the technique applied when the column 11 is a split flow column. The heat transfer elements 16 are located on alternate plates or trays, where the liquid flow over the plates is in opposite directions from a pair of side inlet weirs 30 to central outlet weirs 31 and a central downcomer 32. The heat transfer elements 16 in this case are in two series extending over the plate in opposite directions, parallel to the liquid flow directions, from the headers which are located in the region between the outlet weirs 31. In the arrangement illustrated, there is one common inlet header 15 for both series of heat transfer elements but separate outlet headers 18 for the two series. A similar arrangement could be used with split flow trays if heat transfer elements are required between all plates or irregularly between plates of a stripping column.

FIGS. 9 and 10 shown an alternative embodiment in which the number of plates in the rectifying column 12 is required to be larger than in the stripping column 11. In this case, by way of illustration, a regular arrangement is shown in which there are heat transfer elements 16 on all the plates in a given section of the stripping column 11 whilst take-off of vapor is provided, and liquid returns, at intervals of every third plate in the rectifying column 12. In this case also the stripping column 11 is made of rectangular section so that the heat transfer plates 16 may be inserted in a regular array covering the full area. The containing walls of the column are shown to be curved in the vertical flow so as to increase strength for containing the internal pressure. It may be necessary in this case to have external tension rods, or similar devices, fixed between the top and bottom covers of the column to prevent the column extending vertically when pressurised. The weir and downcomer arrangements are not shown in either column, but these could be of normal design, or the amount of free area resulting from the perforations in the plates could be sufficient to allow liquid drainage to occur. Subsidiary liquid off-takes could be taken from intermediate levels in the high pressure column 12, as before.

In any of these arrangements design calculations may be made to show precisely on which trays of the stripping column the heat transfer elements should be inserted and what optimal connections should be made to corresponding trays in the rectifying column so as to give the most desirable matching or inter-relation of the distillation processes in both columns. In general, this will lead to approximately parallel temperature profiles over an appreciable length of both columns. The presence of valves or other constrictions in some or all of the liquid return lines will allow the system to be 'turned' finally in operation to give the best separation performance.

The invention also exxtends to an equivalent design with heat transfer elements mounted above some or all of the plates of the rectifying column in which part or all of the liquid withdrawn from some or all plates of the strippping column is partially evaportated, the resulting 2-phase mixture being returned to the stripping column normally at the same level from which each liquid stream was withdrawn. All the same variants with respect to distribution of draw-off points and the insertion of corresponding sets of heat transfer plates as for the previously described partial condensation approach will apply. In general, this scheme of liquid withdrawal from the stripping column will be less favourable because the area of high pressure column for the insertion of heat transfer elements will be less great, the heat transfer characteristics will be inferior and the pressure drop in these elements and manifolds will be more difficult to accommodate.

Although as shown in the drawings the columns have only a few plates it will be understood that this is merely for convenience of illustration and, in practice, each column may have a number of plates in the order of, say 20 or more.

Further modifications are possible, without departing from the scope of the invention. Thus, if desired, the heat transfer elements in the variable reboil column 11 can have secondary heat transfer surface, in the form of finning, etc., either internally or externally. Also, although the wall sections of the column 11 in FIG. 9 have been shown as convexly curved, they could instead be concave.

What I claim is:

1. Distillation apparatus wherein first and second distillation columns are arranged side-by-side to interchange heat with one another and thereby provide reboil at a series of different levels in said first column so that it functions as a stripping column, and reflux at a series of different levels in said second column so that it functions as a rectifying column, thereby to achieve a close approach to thermodynamically ideal fractionation, said first column comprising a feed inlet near its upper end for admitting to said first column a liquid feed stream containing higher and lower boiling components, outlets for gas and liquid respectively at the top and bottom of said first column, means within said first column for promoting contact between rising gas and descending liquid thereby to create regions of mixed gas/liquid phase in the form of froth within said first column, and a plurality of indirect heat transfer means in said first column at intervals along its height and located in said froth regions, said second column including a feed inlet near its lower end for admitting to said second column a gas stream containing higher and lower condensing components, outlets for gas and liquid respectively at the top and bottom of said second column, means within said second column for promoting contact between rising gas and descending liquid, a plurality of vapor withdrawal ducts at intervals along the height of said second column and equal in number to the number of heat transfer means in said plurality of indirect heat transfer means in said first column, the lowest such withdrawal duct being connected to convey vapor into the lowest of said indirect heat transfer means for partial condensation therein without mixing with the fluids in said first column, the next withdrawal duct above the lowest being connected to convey vapor into the next heat transfer means above the lowest, and so on up the height of said columns, and a plurality of return duct means, equal in number to vapor withdrawal ducts, for conducting condensate and condensed vapor from a respective heat transfer means to a point of re-entry to said second column at a level just above its corresponding vapor withdrawal level.

2. Apparatus according to claim 1, wherein the second column contains distillation plates, each vapor withdrawal duct withdraws vapor from the space below a respective plate, and the corresponding return duct returns the partially condensed vapor to the space above the same plate.

3. Apparatus according to claim 1, wherein a control valve is provided in at least some of the vapor withdrawal and return flow ducts.

4. Apparatus according to claim 1, wherein said second column is a higher pressure column than said first column.

5. Apparatus according to claim 1, wherein said first column is mounted at a higher level than said second column, each vapor withdrawal duct having an up-flow leg and the return flow in the corresponding return duct being horizontal or downward.

6. Apparatus according to claim 1, wherein said first column is a split flow column and the heat transfer elements of each heat transfer means are in two series extending horizontally in opposite directions from a common inlet header at the center of the column, each series having a separate outlet header.

7. Apparatus according to claim 1 wherein said first column contains distillation plates, and each of said heat transfer means is located immediately above the surface of respective plate.

8. Apparatus according to claim 7, wherein the heat transfer means extend in height for about ⅓ to ⅔ of the distance between plates in said first column.

9. Apparatus according to claim 7, wherein said first column is rectangular in cross section to enable the heat transfer means to cover the area of their respective plates uniformly.

10. Apparatus according to claim 9, wherein the walls of said first column are curved in the vertical plane so as better to sustain the internal pressure.

11. Apparatus according to claim 1, wherein each of said heat transfer means comprises a generally horizontal inlet header, a generally horizontal outlet header a short distance below the inlet header, and a heat exchanger assembly connecting the inlet and outlet headers which heat exchanger assembly has a height approximating to the vertical distance between the inlet and outlet headers and extends across said first column for a horizontal distance much greater than its height.

12. Apparatus according to claim 11, wherein each of said heat exchange assemblies comprises a plurality of spaced parallel heat transfer elements containing flow passages from the inlet header to the outlet header the height of each said element being several times greater than its horizontal width.

13. Apparatus according to claim 11, wherein each heat exchange assembly comprises a series of parallel horizontally spaced tubular serpentines having comparatively long horizontal limbs and comparatively short vertical limbs.

14. Apparatus according to claim 11, wherein each heat exchange assembly comprises a series of parallel horizontally spaced double-walled panels with fluid flow-passages between the panel walls.

15. Apparatus according to claim 14, wherein each panel comprises two wall sheets which are bonded together around their free edges and along a pattern of regularly horizontally spaced vertical lines over the central area of the panel height, the regions of the two wall sheets between the bonded lines being forced apart.

16. A distillation process wherein first and second distillation columns are arranged side-by-side to interchange heat with one another and thereby provide reboil at a series of different levels in the first column so that it functions as a stripping column, and reflux at a series of different levels in the second column so that it functions as a rectifying column, thereby to achieve a close approach to thermodynamically ideal fractionation, said process comprising the steps of:

admitting to said first column near its upper end a liquid feed stream containing higher and lower boiling components;

withdrawing gas and liquid from the top and bottom respectively of said first column;

promoting contact between rising gas and descending liquid in said first column so as to create regions of mixed liquid/gas phase in the form of froth;

admitting to the second column near the lower end thereof a gas feed stream containing higher and lower condensing components;

withdrawing gas and liquid from the top and bottom respectively of said second column;

promoting contact between rising gas and descending liquid in said second column;

withdrawing vapor fractions separately from a series of levels at intervals along the height of the second column;

partially condensing each of said withdrawn vapor fractions in the first column and returning each partially condensed fraction to the second column at a level just above the level from which it was withdrawn, said vapor fractions being partially condensed in the first column by indirect heat exchange with the fluids in the froth regions in said first column, without mixing with those fluids, at a series of levels up the height of the first column equal to the number of vapor fractions withdrawn, the vapor fraction withdrawn from the lowest level of the second column being partially condensed at the lowest of said levels in the first column, the vapor fraction withdrawn from the next above the lowest level of the second column being partially condensed at the next above the lowest of said levels in the first column, and so on up the columns.

17. A process according to claim 16 wherein the second column is operated at a higher pressure than the first column.

18. A process according to claim 16 wherein the first column is at a higher elevation than the second column.

* * * * *